(12) United States Patent
Gai et al.

(10) Patent No.: US 7,949,249 B2
(45) Date of Patent: May 24, 2011

(54) SOFTWARE BASED PHOTOFLASH SYNCHRONIZATION OF CAMERA EQUIPPED PORTABLE MEDIA DEVICE AND EXTERNAL LIGHTING APPARATUS

(76) Inventors: Bowei Gai, Flushing, NY (US); Brett Bilbrey, Sunnyvale, CA (US); Henry Teng, Cupertino, CA (US); Osei Kofi Poku, Pittsburgh, PA (US); Heer Robin Gandhi, Pittsburgh, PA (US)

( * ) Notice: Subject to any disclaimer, the term of this patent is extended or adjusted under 35 U.S.C. 154(b) by 32 days.

(21) Appl. No.: 12/277,687

(22) Filed: Nov. 25, 2008

(65) Prior Publication Data
US 2009/0136225 A1    May 28, 2009

Related U.S. Application Data

(60) Provisional application No. 61/004,468, filed on Nov. 28, 2007, provisional application No. 61/132,840, filed on Jun. 23, 2008.

(51) Int. Cl.
G03B 9/79    (2006.01)
G03B 15/02    (2006.01)

(52) U.S. Cl. ....................................................... 396/180

(58) Field of Classification Search .................. 396/180; 348/370, 371
See application file for complete search history.

(56) References Cited

U.S. PATENT DOCUMENTS

| 7,664,387 B2 * | 2/2010 | Perala et al. .................. 396/166 |
| 2003/0013484 A1 * | 1/2003 | Nishimura et al. ............ 455/556 |
| 2005/0124379 A1 * | 6/2005 | Liu ............................. 455/556.1 |
| 2006/0018653 A1 * | 1/2006 | Kido .............................. 396/310 |
| 2007/0260798 A1 * | 11/2007 | Griffin .......................... 710/303 |
| 2008/0053770 A1 * | 3/2008 | Tynyk ........................... 190/100 |

FOREIGN PATENT DOCUMENTS

| JP | 2005221595 A | * | 8/2005 |
| JP | 2006018181 A | * | 1/2006 |

OTHER PUBLICATIONS

Williams, J. et al., Simple Circuitry for Cellular Telephone/Camera Flash Illumination, Linear Technology, AN 95, pp. 1-12, Mar. 2004, Milpitas, CA.
Hijazi, A. et al., A novel ultra-high speed camera for digital image processing applications, Meas. Sci. Technol. vol. 19 (2008) 085503, pp. 1-11. IOP Publishing, Bristol UK.
Khoury, R., Dual-LED vs Xenon Flash—A Real World Test, website: http://www.symbian-guru.com, Aug. 30, 2008.
Petschnigg, G. et al., Digital Photography with Flash and No-Flash Image Pairs, Siggraph, Aug. 2004, vol. 23, Issue 3, pp. 1-9, Los Angeles, CA.

* cited by examiner

*Primary Examiner* — W. B. Perkey
*Assistant Examiner* — Noam Reisner
(74) *Attorney, Agent, or Firm* — David G. Oberdick; Peter J. Borghetti

(57) ABSTRACT

Methods of using software to synchronize the control of a camera on portable media device with the photoflash on an external lighting apparatus.
The Camera-Equipped Portable Media Device (CEPMD) utilizes an External Lighting Apparatus (ELA) as a light source to improve the lighting conditions for portable media device photography. Both ELA and CEPMD are controlled by software, which synchronize the photoflash image capture as well as post process the image to further enhance the image quality. Furthermore, in a preferred ELA embodiment, it acts as a protective case for the CEPMD.

25 Claims, 10 Drawing Sheets

SOFTWARE BASED PHOTOFLASH SYNCHRONIZATION OF CAMERA EQUIPPED PORTABLE MEDIA DEVICE AND EXTERNAL LIGHTING APPARATUS

CROSS-REFERENCE TO RELATED APPLICATIONS

This application claims priority under 35 U.S.C. §119(e) to Provisional Application Ser. No. 61/004,468, filed Nov. 28, 2007, and Provisional Application Ser. No. 61/132,840, filed Jun. 23, 2008, each incorporated by reference in its entirety.

FIELD OF THE INVENTION

The invention generally relates to the field of portable media device photography, particularly a method of synchronizing an external lighting apparatus and a camera-equipped portable media device via software and related methods of enhancing image quality.

BACKGROUND INFORMATION

Miniaturized camera is becoming a standard component on Today's portable media devices, such as a mobile phone, portable media player, personal digital assistant, etc. Due to inadequate lighting, poor lighting is a common problem that almost all Camera-Equipped Portable Media Device (CEPMD) suffers. This is particularly important for digital photography with poor image sensors, because lighting condition dramatically affects the media quality.

Using an External Lighting Apparatus (ELA) to improve lighting is not practical for several reasons: 1) small/underpowered lights cannot provide adequate lighting for camera photography without a proper photoflash component, 2) if the ELA exists, the timing window between the photoflash trigger and the camera shutter is so small, it is not feasible to trigger the two components separately, 3) adding a big separate ELA attachment to the CEPMD defeats the purpose of having the device small and portable.

SUMMARY OF THE INVENTION

This invention addresses the few key issues mentioned above. The invention uses software-based synchronization to properly trigger the photoflash in conjunction with camera shutter, resulting in a fully illuminated image.

A further object of the invention solves the problem of having a separate ELA attachment by enclosing the ELA circuits in a case, which also serves as a protective case for the CEPMD. The protective case utilizes a pass through connector to 1) allow other connectors to connect to the portable media device, and to 2) connect the circuitry on the protective case to the portable media device. The protective case effectively combines the ELA with the CEPMD as one, allowing the ELA to be portable and readily available whenever the CEPMD is being used.

A synchronized, software control between the portable media device camera and the external lighting apparatus is provided. The method and apparatus include a camera-equipped portable media device that communicates with an external light apparatus.

According to the invention, the synchronization software calculates the expected timing delays and tolerances and adjusts the exposure window. The software sets off the photoflash and shutter trigger so that the photoflash strikes within the exposure window. The method takes into consideration delays and errors from different parts of the system, which can be both fixed and variable.

The software captures multiple images and runs post-process algorithms, ultimately resulting in a synchronized fully illuminated image. This multi-capture software synchronization method is used when CEPMD and ELA control is limited, or if the total error in the system is greater than the exposure time. The method greatly increases the capture window while maintaining a high capture rate.

Additionally, the software post-processes the photoflashed image(s) to improve the quality of the result image. The system sharpens the image to negate the grainy effects of the long exposure. The system blends the exposure of the images with and without photoflash to produce a better image. If there is missing data due to improper timing, the software backfills the missing data using the relevant information from other images.

In a further aspect of the invention, the specific lighting intensity and pattern is software controlled to produce the optimal image quality. The duration and photoflash pattern can be adjusted either manually or automatically in relation to parameters, including but not limited to, camera sensor, mode of shooting, object distance, ambient lighting, and redeye reduction settings.

The ELA's preferred embodiment is a case that encloses and protects the ELA circuitry as well as the CEPMD from minor damage. The exterior of the case includes a built-in self-portrait mirror to help facilitate self-portrait photography. In a preferred embodiment, the ELA connects to the CEPMD via a pass through connector. The CEPMD operates normally when connected to the case, allowing other devices to connect to CEPMD through the pass through connector. The pass through connector not only passes through all of the communication signals, but also connects power and trigger signals to the case's ELA circuit.

In an alternative embodiment of the invention, ELA can be implemented wirelessly. This requires the ELA to have its own power supply as well as a wireless connectivity module. The wireless solution can be a completely detachable device that triggers wirelessly using same software synchronization methods.

BRIEF DESCRIPTION OF THE DRAWINGS

The invention is further illustrated by the following drawings in which.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

Figure 1:
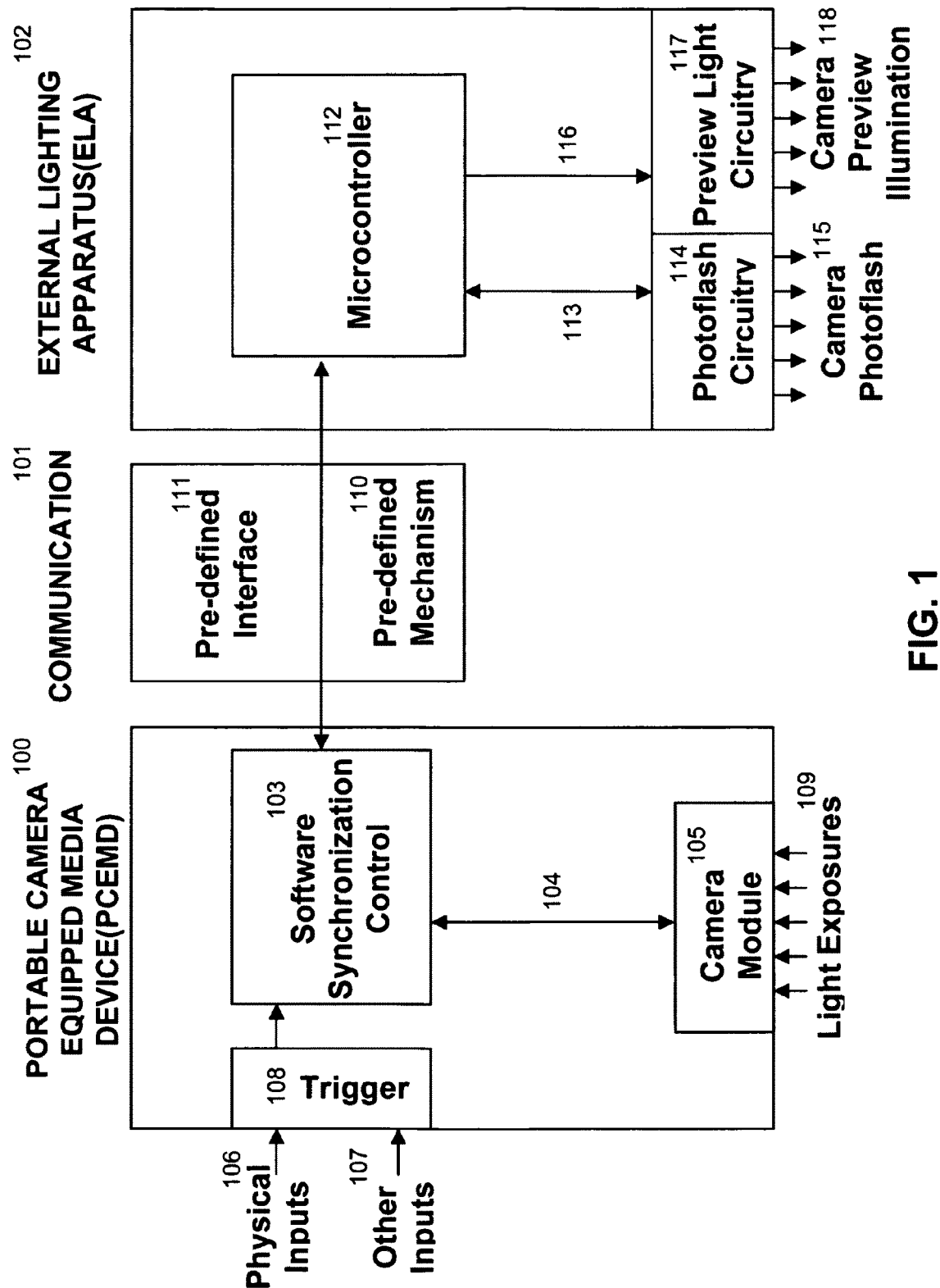
FIG. 1 shows the simplified system block diagram and communication between the different major components of the system.

FIG. 1 shows a block diagram of the software synchronization system between the CEPMD and ELA. This system consists of three main components.

The first part of the system is the CEPMD (100). A CEPMD is defined to be any portable media device with an embedded camera, where the camera is not the primary function of the device. Examples of such devices include Portable Media Players (PMP), mobile phones, and Personal Digital Assistants (PDA).

The second part of the system is the ELA (102). An ELA is defined to be an apparatus used to provide external lighting support to the CEPMD. For the intended use of still photography, this apparatus is capable of producing a short burst of powerful light known as a photoflash (115). For the intended use of video photography or camera preview, the apparatus provides a continuous but relatively weaker illumination (118).

The third part of the system is a communication (101). The communication block connects the CEPMD to ELA through a predefined mechanism (110) as well as a predefined protocol (111). Through this communication, the CEPMD controls the ELA and synchronizes the camera image capture with the photoflash.

In the CEPMD (100), the software synchronization control (103) gathers necessary information, processes it, and exerts control over the rest of the system. The software (103) takes input from the user which can manifest itself as a hardware input (106) such as a button press or screen touch, or an alternative input (107) such as a data packet from Wi-Fi. This input translates into a signal which triggers (108) the image capture for the synchronization software (103). The synchronization software (103) then prepares the on-board camera module (105) through a predefined interface (104) and sets it up for the pending photoflash image capture.

Through a predefined interface (111), the synchronization software (103) readies the ELA microcontroller (112) for a pending photoflash image capture. The actual connection (110) between CEPMD and ELA can be either wired or wireless.

In the ELA (102), a microcontroller (112) controls two types of external lighting (114, 117) through predetermined interfaces (113, 116). The microcontroller also controls the communication to the CEPMD. ELA photoflash circuitry (114) contains one or more high powered light emitting devices as a source of photoflash (115). Typical photoflash uses xenon flash lamps, but a short burst of high-powered LEDs can be sufficient for low end portable photography. ELA preview light circuitry (117) contains one or more lower powered light that provide a continuous-on source of illumination. The preview light circuitry (117) typically contains one or more LEDs and is used for video photography or preview illumination (118).

FIG. 2 describes the first method of photoflash synchronization between the CEPMD and ELA. This method generally requires low level software control of the CEPMD camera as well as accurate information of the timing delays in hardware, software and communication.

Figure 2A:
FIG. 2 describes the first method of software photoflash synchronization between CEPMD and ELA.

Referring to FIG. 2a, a digital camera capture process (200) is simplified into three periods in this illustration. Setup (201) is the period of time the software requires to prepare the camera for the upcoming image capture. Exposure (202) is the period of time the camera exposes the image sensors to the light. In the digital camera realm, it refers to the time between when the image sensors reset and the time values are recorded. Record (203) is the period of time when the values in the camera sensors are read and recorded. For a successful photoflash capture, the photoflash needs to occur inside of the exposure (202) and have enough time before record (203) to properly saturate the camera image sensors.

To achieve successful photoflash capture, synchronization software looks up or calculates the time delay from sending a trigger signal to producing a photoflash on the ELA. At the same time, the software looks up or calculates the time delay to setup a camera for a photo capture. The software then triggers both systems at specific predetermined time to capture a photoflashed image.

To ensure proper photoflash image captures, the software needs to calculate the max errors (209, 210) in the system and verify that the photoflash occurs within PFlash_start_earliest (207) and PFlash_start_latest (208).

Figure 2B:
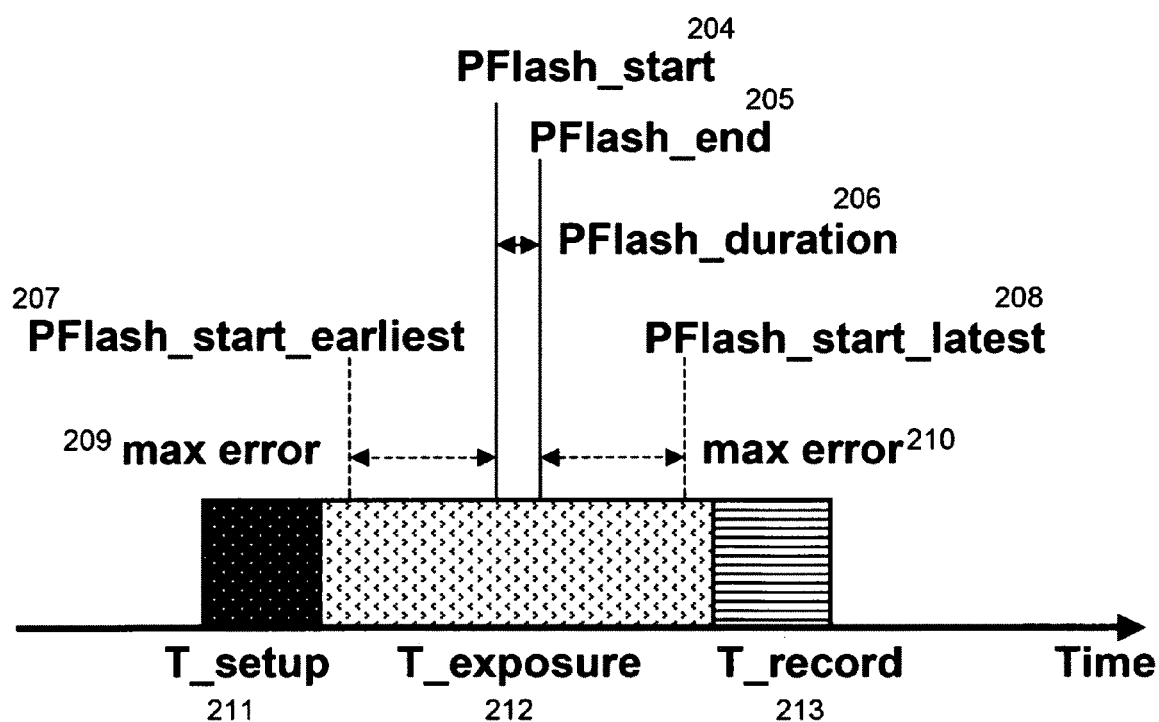

Now referring to FIG. 2b. T_setup (211) is the period of time to setup the camera, T_exposure (212) is period of time when the camera exposes the sensors, and T_record (213) is the period of time in which the camera reads back the captured image values.

A photoflash will start at PFlash_start (204) and end at PFlash_end (205). The difference in time is PFlash_duration (206). To ensure a successful photoflash capture, the earliest possible photoflash start time is PFlash_start_earliest (207), which starts as soon as the camera is in T_exposure (212). In contrast, the latest start time for the photoflash is PFlash_start_latest (208), which needs to be inside of T_exposure (212) and have sufficient time before T_record (213) to allow proper image sensor exposure.

Errors (209, 210) in the photoflash synchronization system originate from many different places, and it affects all methods of synchronization. Most often, the errors result from physical uncertainties, manufacture uncertainties and lack of software control. For example, if the distance between the wireless ELA and the CEPMD increases, the delay in the communication will increase as well result in physical uncertainties. Alternatively, if the CEPMD does not have access to low level controls, synchronization software might not have the ability to pinpoint when a software command will execute. The issued software command will depend on various other background processes running on the CEPMD at the same time. Additionally, no two pieces of hardware are the same due to the nature of the manufacturing process, which contribute to manufacture uncertainties. Under this method of synchronization, it would require extensive calibration both on the CEPMD and the ELA.

Given that the software has control over the low level camera capture settings and the errors in the system, a synchronized photoflash can be captured by simply enlarging the exposure window (212). This would not be an ideal solution as an increase in exposure time leads to many photographic defects, such as noise, blur, and overexposure. Sharper image quality tends to require a shorter exposure window (212). Achieving this is possible if the system reduces the errors in the software, hardware, and communication such that total errors (209, 210) are small in comparison to the ideal T_exposure (212). However, if max error (209, 210) is much greater than the ideal T_exposure (212), an alternative synchronization method is needed, such as the one in outlined in FIG. 3.

Figure 3:
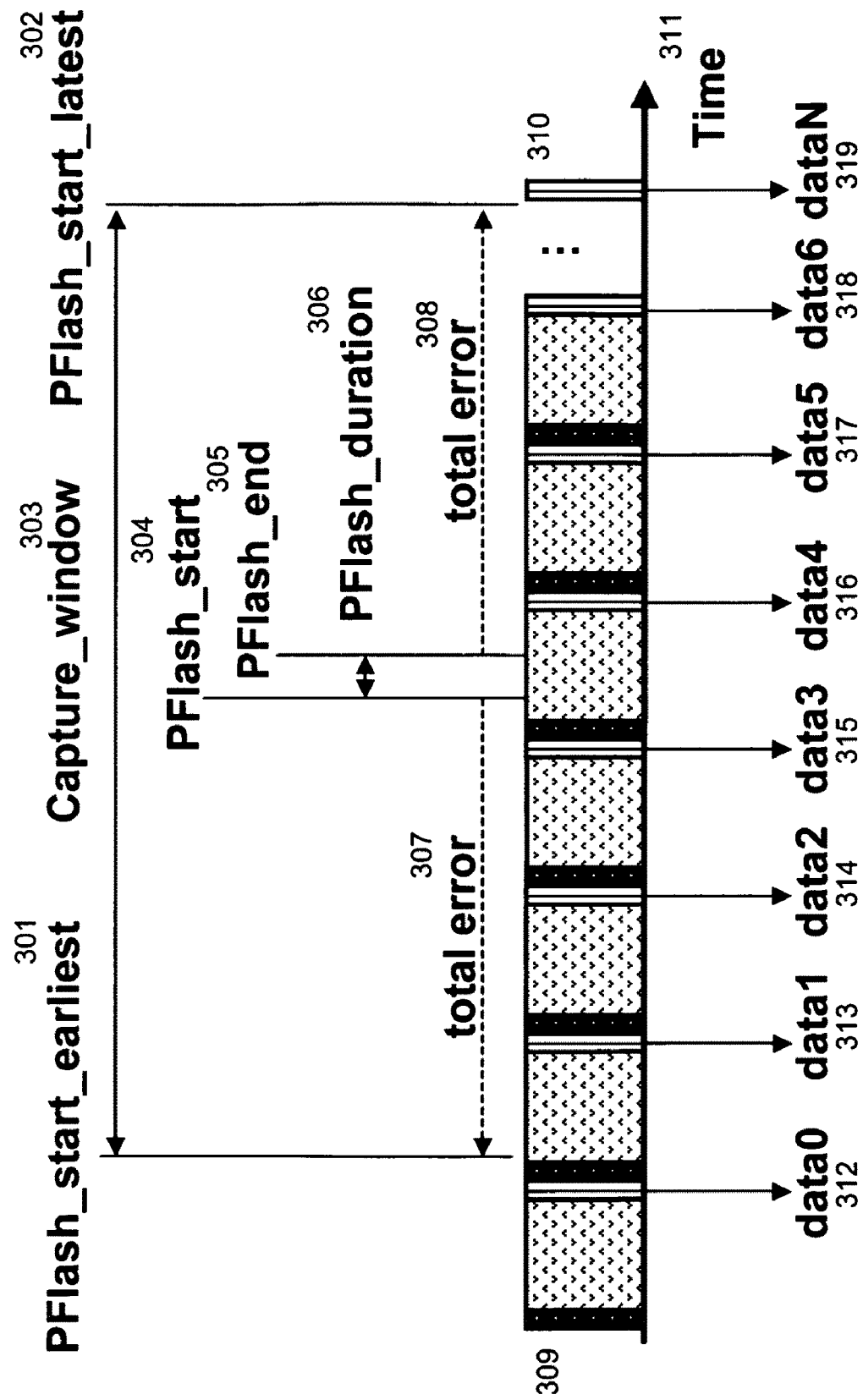
FIG. 3 describes the second method of software photoflash synchronization.

FIG. 3 describes an alternative method of synchronization through multi-capture. This method is optimal when synchronization software (103) does not have fine control over the timing of the camera capture, timing of external photoflash, exposure of the camera, or if the max error in the system is greater than the exposure time.

The multi-capture method does not require the exact timing of the photoflash or the image capture, but requires an approximation of the timing of the two events over period of time (typically much less than 1 second). The method achieves synchronization by taking multiple captures over a period of time (311), followed by post processing of the image capture in order to reproduce a synchronized photoflash image.

Identical to the FIGS. 2a, 2b, FIG. 3 image capture process is divided into 3 steps but replicated many times over time. The same shading scheme used in FIG. 3 for setup (201), exposure (202), record (203) and its respected timing periods T_setup (212), T_exposure (212), T_record (213).

In a typical sequence, synchronization software sets up the camera, initiates an image capture prior the earliest possible time of photoflash (301), and records and stores the data0 (312). The first image capture will serve as a baseline image that software will use for later comparisons.

The software then sets off a series of image captures for the time of the possible occurrence of the photoflash. Data1 to dataN (313-319) from the image captures are all possible candidates for the successful synchronized image captures. By comparing these images with the baseline image, synchronization software can intelligently pick out and return the successful synchronized image capture, if it exists.

The method to pick out a photoflashed image utilizes luminosity information from each image, assuming in a photoflashed image many pixels will be significantly brighter than the baseline image. This method extracts the pixel luminosity values from data1 to dataN, and compares each set of pixel values to the pixel values in the baseline image. The method will return a synchronized image capture if it detects a drastic change in the pixel luminosity values, otherwise the method returns the brightest image it could find.

PFlash_start_earliest (301) starts as early as the second exposure starts, and PFlash_start_latest (302) occurs inside of the last exposure in enough time before dataN (319) readout to allow sufficient exposure of the image sensors. The time between PFlash_start_earliest and PFlash_start_latest is the capture window (303), where the photoflash can start.

Similar to FIG. 2b, a photoflash will start at PFlash_start (304) and end at PFlash_end (305). The difference in time is Flash_duration (206). Since the capture window (303) is significantly larger than a single T_exposure (212) in the previous method, the room for total errors (307, 308) increases by N−1 times.

As illustrated by the FIG. 2b, this method allows for a much greater range of error from the system while maintaining a high rate of synchronized capture. This method works especially well for TTR sensor or CMOS sensor with a global reset trigger. If the photoflash timing is truly random over a period of time, the success capture rate for this method is approximately (T_exposure)/(T_exposure+T_setup+T_record), over a period of (N−1)* (T_exposure+T_setup+T_record).

To extend a capture window (303) in this method, synchronization software increases the number of captures. To improve the capture rate of this method, the system can decrease the T setup and T_record or increase T_exposure. However, to avoid photographic defects, T_exposure should be kept at a minimum.

Figure 4A:
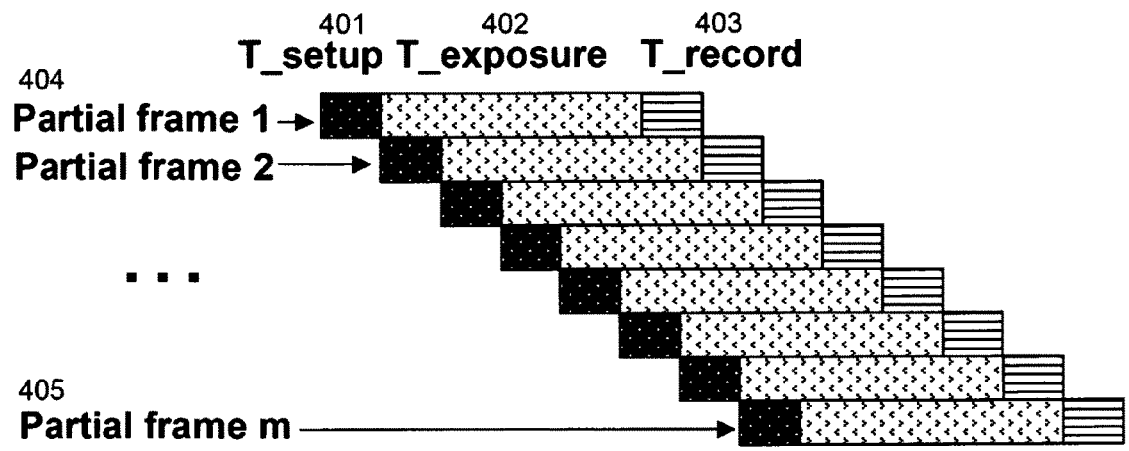
FIG. 4 describes an improvement of the multi-capture software synchronization method described in FIG. 3.
Figure 4B:
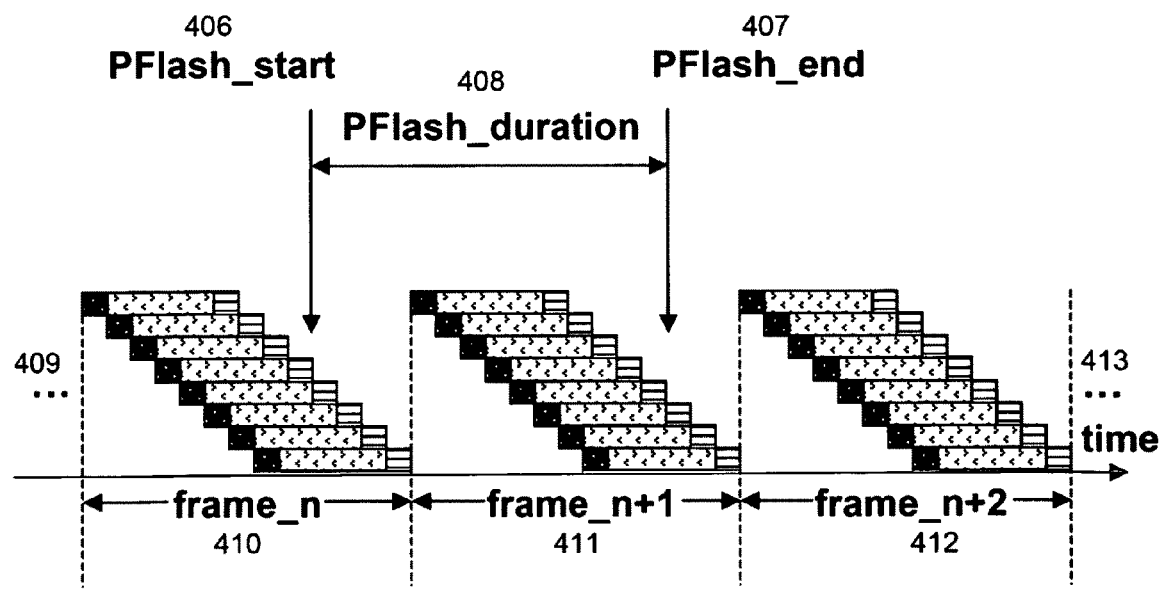

FIG. 4b describes an improvement to the method outlined in FIG. 3. In the case of a photoflash spread between multiple images, as often experienced by the CMOS camera rolling shutter, the image captures generally tends to be only partially exposed.

The mechanism of the rolling shutter causes this photographic defect by not exposing the entire image sensor at the same time, as shown in FIG. 4a. In each rolling shutter frame (400), there are many partial frames that typically consist of a row or a column of pixels. Numbering these from partial frames 1 (404) all the way to partial frame m (405), together it makes up one complete image. The roller shutter guarantees that the difference between T_setup and T_record is the same, while the actual start time of the each step may vary.

Now referring to FIG. 4b, PFlash_start (406) happens in the middle of a rolling shutter frame_n (410). The PFlash_duration (408) is long enough such that the PFlash_end (407) extends into the following rolling shutter frame, frame_n+1 (411). In this example, frame_n (410) records early partial frames without photoflash and latter partial frames with photoflash. Subsequently, frame_n+1 (411) records early partial frames with photoflash and latter partial frames without photoflash. In this example, the rolling shutter creates two partially exposed images.

The method to synchronize image capture with photoflash is similar to the method outlined in FIG. 3. The software initiates a series of camera captures (409-413), where the first image (309) is a baseline image for comparison that is guaranteed not to have the photoflash. Synchronization software stores all of the data of all the frames and post processes the data to reproduce a synchronized flash image.

In this method, instead of detecting an image with full photoflash synchronization, synchronization software detects partial frames with photoflash in images. Using this information, the software can accurately determine the time and the duration of the photoflash. Once the software determines the time of the photoflash as perceived by the image sensors, it begins the image reconstruction process.

The image reconstruction process uses available data, which includes but is not limited to time of the photoflash, photoflashed flash pixel values, pixel distortions around the time of the photoflash, and information from the pixels without photoflash. Through techniques such as blending, stitching, weighted averaging, the software reconstructs a fully-illuminated image from the set of partially exposed rolling shutter frames.

This is another improvement over the previous two methods. This method allows for longer image capture window while attaining higher probability of capturing a successful photoflash image.

Figure 5:
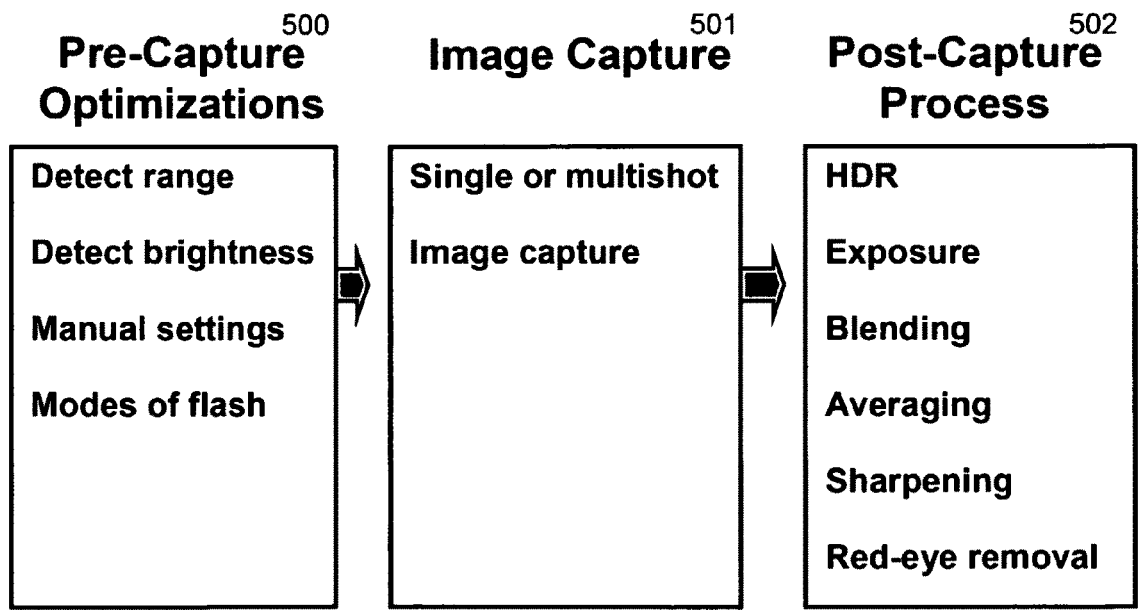
FIG. 5 describes the method of photoflash image enhancement in this system.

FIG. 5 details the method of photoflash image enhancement in this system. The image enhancement method breaks down into three steps, which works in conjunction with the software synchronization. The first step prepares the camera and the photoflash by detecting the surrounding environment. The second step captures the image with photoflash using methods described in FIG. 2-4. The last step processes with information gathered from the pre-capture optimizations.

In step 1, there are many factors that can be taken into consideration for pre-capture optimization (500). Different modes of photoflash can be used to enhance the picture, such as red-eye reduction, strobe, and different lengths of photoflash. These settings can be adjusted either manually or automatically from surrounding settings. Examples of auto adjustments include detection of the distance between the subject and the camera, face detection, and brightness detection. These detections can be done either through software or with ELA hardware assists. Information from step 1 is recorded and may be used in step 3 for further image enhancements.

Step 2 initiates the photoflash image captures (501). Once the images are recorded and the best picture is picked out, step 3 further enhances this image.

In the image post processing (502), the software utilizes information from the resulting image and extra information from pre-capture optimizations (500). For instance, if the baseline image is guaranteed to be dark and underexposed while the captured image is a bright photoflashed image, the system will undergo HDR calculations to produce an enhanced image with the most details. Similarly, an exposure blending technique can help reduce the effect of overexposed images. These techniques require the knowledge of the system settings and environment information gathered in step 1 in order to make the best assumptions for manipulating the image. Other techniques include, but are not limited to, averaging, sharpening, and red-eye removal. All of these can potentially enhance the end result of the image.

Figure 6A:
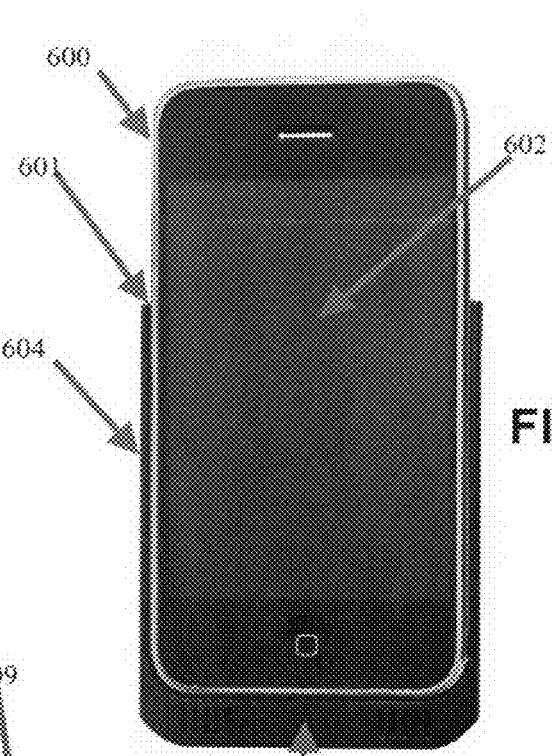
FIG. 6 illustrates a prototype of the system in the preferred embodiment.
Figure 6B:
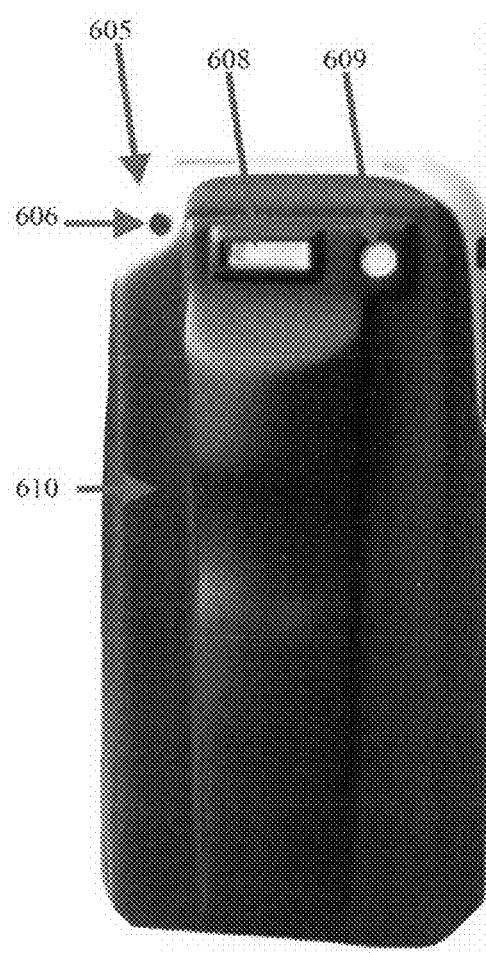
Figure 6C:
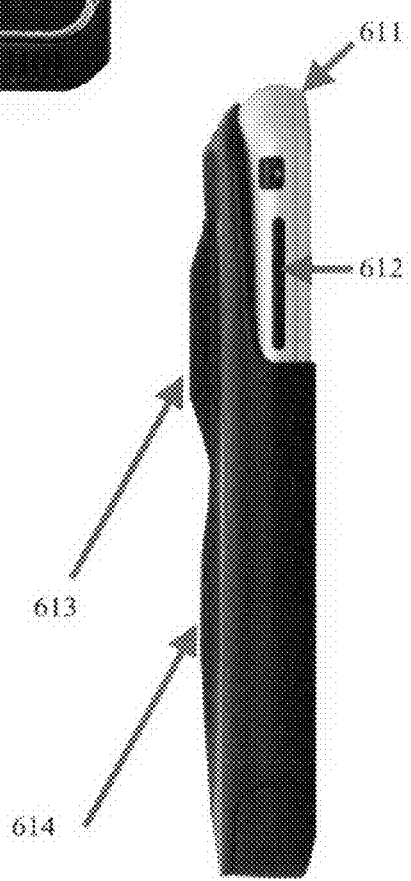

FIGS. 6a, 6b and 6c shows different views of the system outlined in FIG. 1 in the preferred embodiment.

In FIG. 6a, the CEPMD (600) in demonstration is a mobile phone device with an integrated camera which is not the main function of the device. The synchronization software runs on the processing unit (602) of the CEPMD. The CEPMD (600) is connected to the ELA (604) through a wired pass through connection on the bottom dock connector (603). As shown in the figure, the tightly enclosed (601) ELA essentially forms a protective cover for the CEPMD.

Referring to FIG. 6b, the majority backside of the CEPMD (605) is covered by the ELA, which also serves as a protective cover (610). The exposed part of the ELA reveals the camera (606) on the CEPMD (605). In the ELA, there is both a xenon photoflash (608) as well as a LED preview light (609).

FIG. 6c shows the profile view of this system. Hardware buttons (612) on the side of the CEPMD (611) can serve as a camera photoflash trigger, and can also be used in conjunction with other means of user inputs such as touch screen. The two ergonomically fitted humps (613, 614) on the case house a majority of the ELA electrical hardware, includes the photoflash, preview LED light and microcontroller circuitry.

Figure 7:
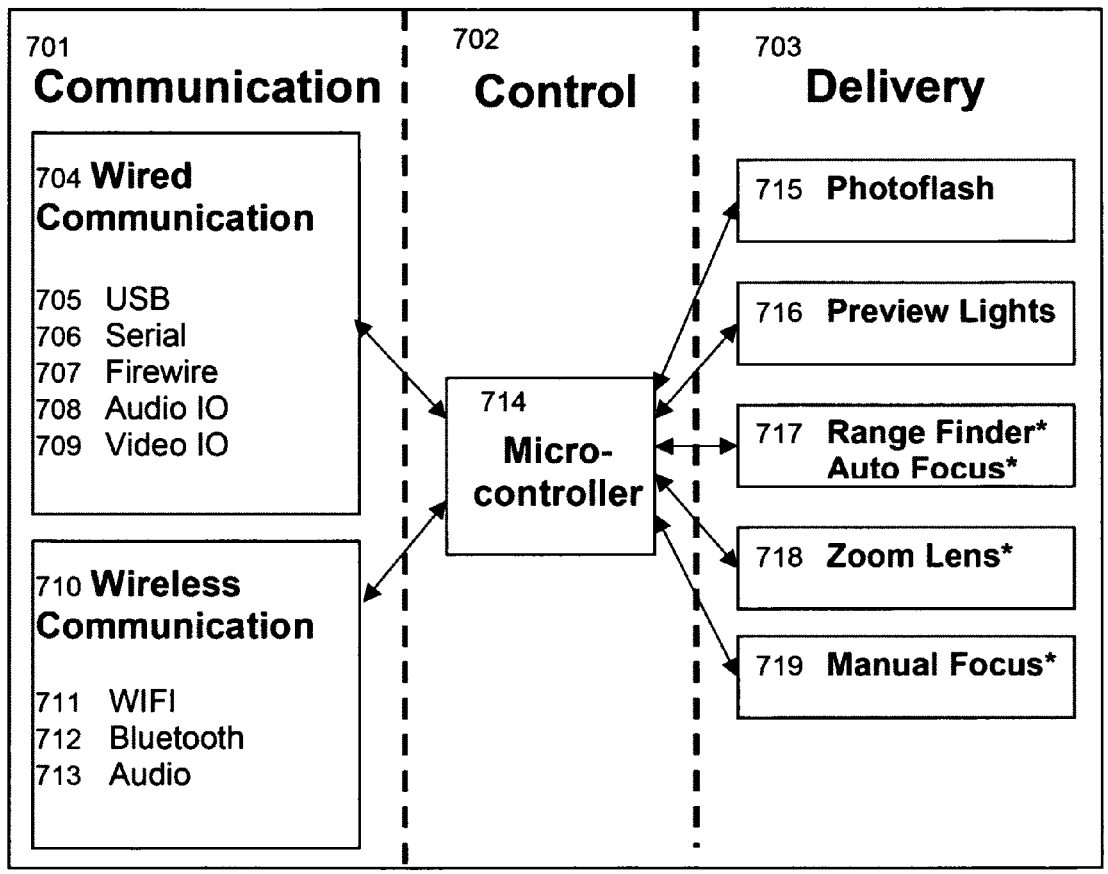
FIG. 7 shows the possible alternative embodiments of the ELA.

Referring to FIG. 7 for possible alternative embodiments of the ELA. ELA (700) is made up of three major blocks with interchangeable pieces of components. The three blocks are communication (701), control (702) and delivery (703).

ELA communication (701) can be either wired (704) or wireless (710). A wired communication would provide the simplest implementation as it enables the possibility of using the CEPMD as a power source for the ELA.

Wired communication can use any protocol that is available on the CEPMD. It can be in the form of a standard protocol, such as USB (705), Serial (706), and Firewire (707), etc. Alternatively, it can be in the form of a proprietary protocol, such as using the audio input/output (708) and video input/output (709) to communicate with the ELA.

Wireless communication works as well through any wireless communication means of CEPMD. This can be a standard protocol such as Wi-Fi and Bluetooth, or can it be a proprietary protocol such as sound wave detection, where the ELA decodes the CEPMD sound signal into controls signals.

ELA control block (702) facilitates any communication between CEPMD and ELA. This block typically consists of a microcontroller, which processes the incoming information and sends out commands to control the rest of the circuitry. Alternatively, the control block can exist completely inside the CEPMD.

ELA deliveries (703) are a set of technologies that are the features of the device. While the main feature is photoflash (715), ELA can contain many more features to enhance the camera on the portable device. This can include but is not limited to preview light (716), range finger and auto focus (717), zoom lens (718) and manual focus (719).

The exact makeup of the ELA can be various combinations of the communication, control, and delivery blocks, as outlined in FIG. 7. A sample mock up of the ELA is shown in FIG. 8.

Figure 8A:
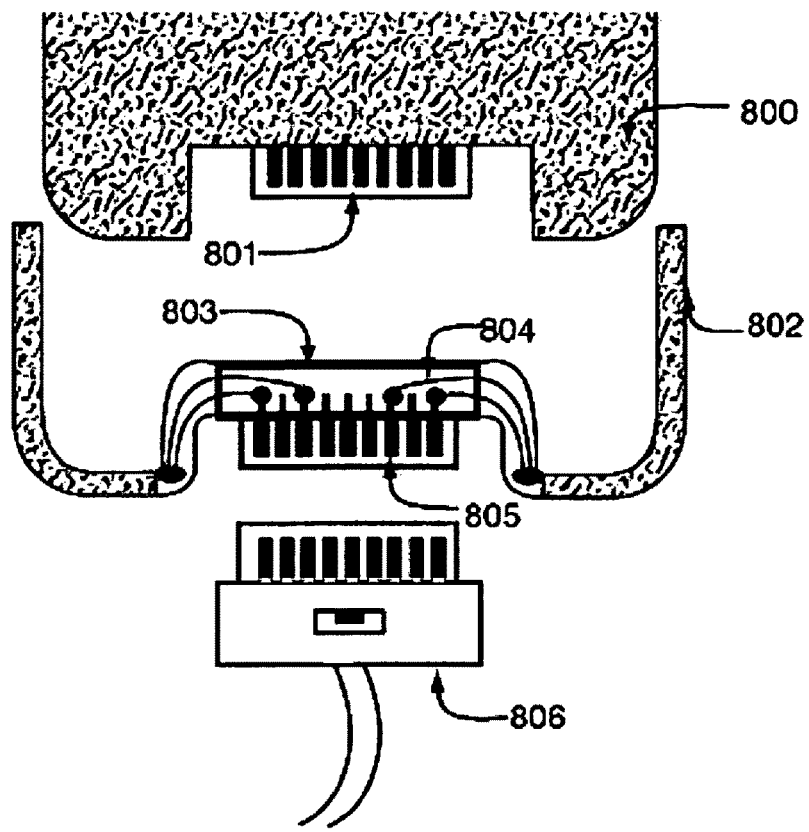
FIG. 8 illustrates examples of two pass through connector design.
Figure 8B:
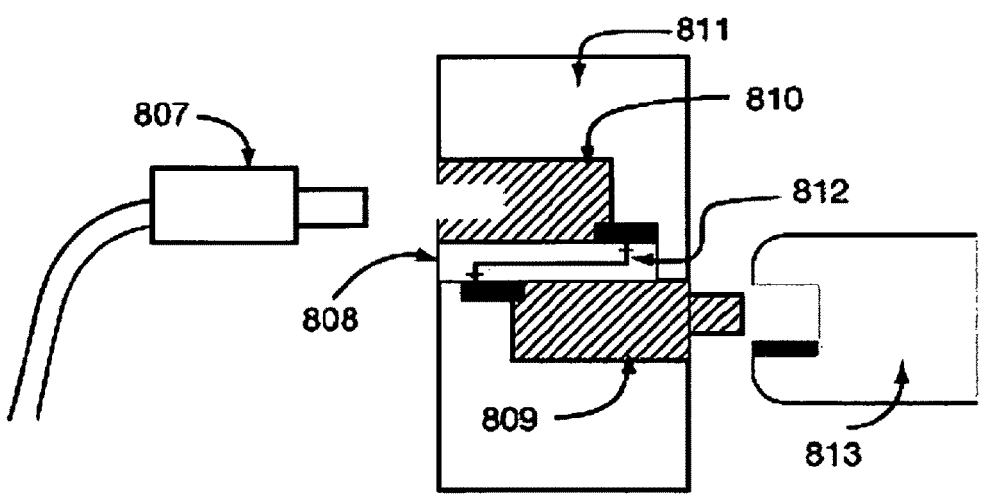

FIG. 8a and FIG. 8b shows two possible methods of implementing the pass through connector for the CEPMD and ELA.

FIG. 8a shows a cross-section of a possible pass-through connector design. The pass-through connector (803) connects the CEPMD (800) to ELA (802). Pins on CEPMD dock connector (801) connects to corresponding pins on the ELA pass-through connector (805). External plug (806) connects to the ELA pass-through connector (805) the same way it would connect to the CEPMD dock connector (801). Additionally, the pass-through connector connects the necessary CEPMD signal and power lines (804) to the ELA circuitry (802).

FIG. 8b shows a vertical cutaway of another pass-through connector design. This design utilizes one male (809) and one female (810) connector stacked vertically to act as one pass-through connector (811).

An external device (807) plugs into the female end of the pass-through connector (810). Signals passes from this female connector (810) to a male connector (809), which plugs into the CEPMD dock connector (813). The pass-through connector (811) essentially passes through the signals from the external device (807) to the CEPMD.

In this design, male and female connectors (910, 909) are joined together by a thin layer of PCB (908). This layer of PCB secures the two connectors via solder and connects the pass-through signals. This layer of PCB also distributes the necessary signals from the CEPMD to the ELA.

Figure 9A:
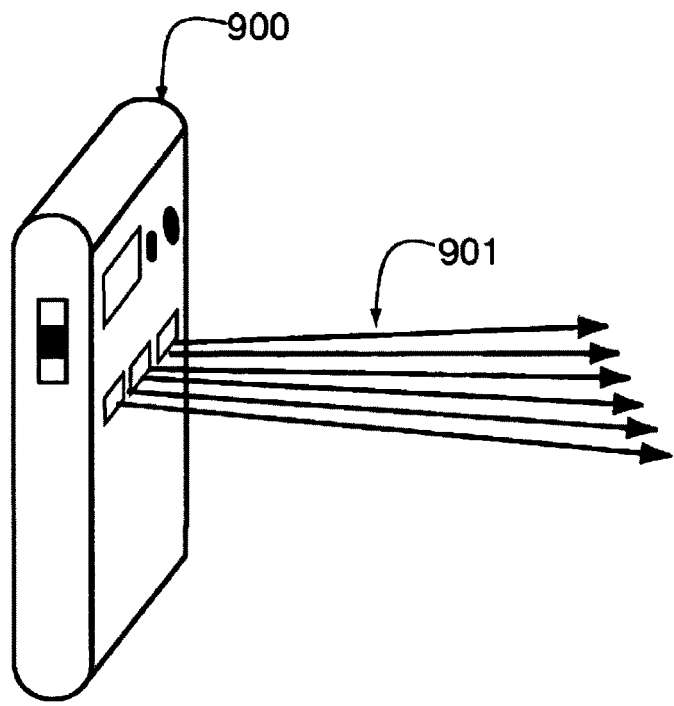
FIG. 9 demonstrates alternative usage of ELA as emergency light and as flashlight.
Figure 9B:
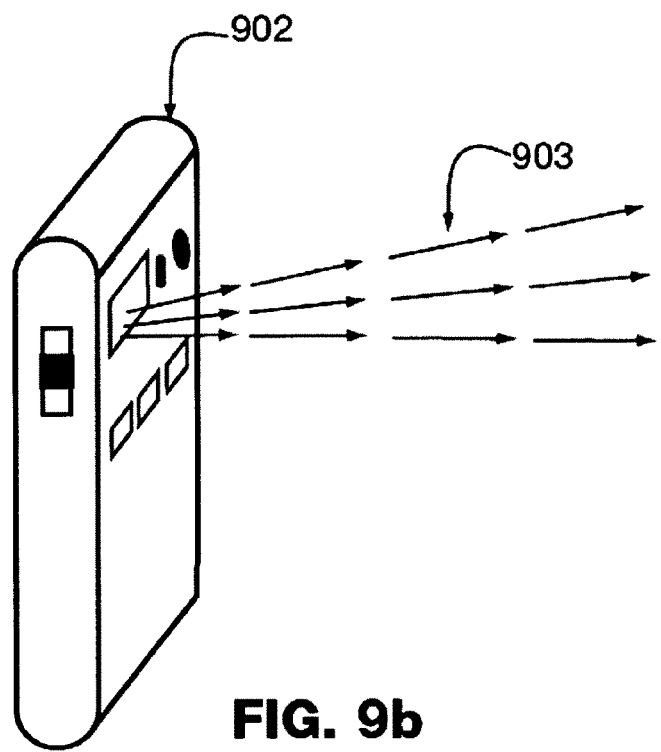

FIGS. 9a and 9b show two alternative usages of the ELA. A simplified drawing of the CEPMD connected with ELA is shown (900, 902).

In FIG. 9a, turning on the preview lights to provide a continuous source of light (901) allows for the apparatus to be utilized as a portable flashlight.

In FIG. 9b, by triggering the photoflash in a set interval as a strobe light (903), this apparatus can be utilized as an emergency signal lighting device.

Figure 10:
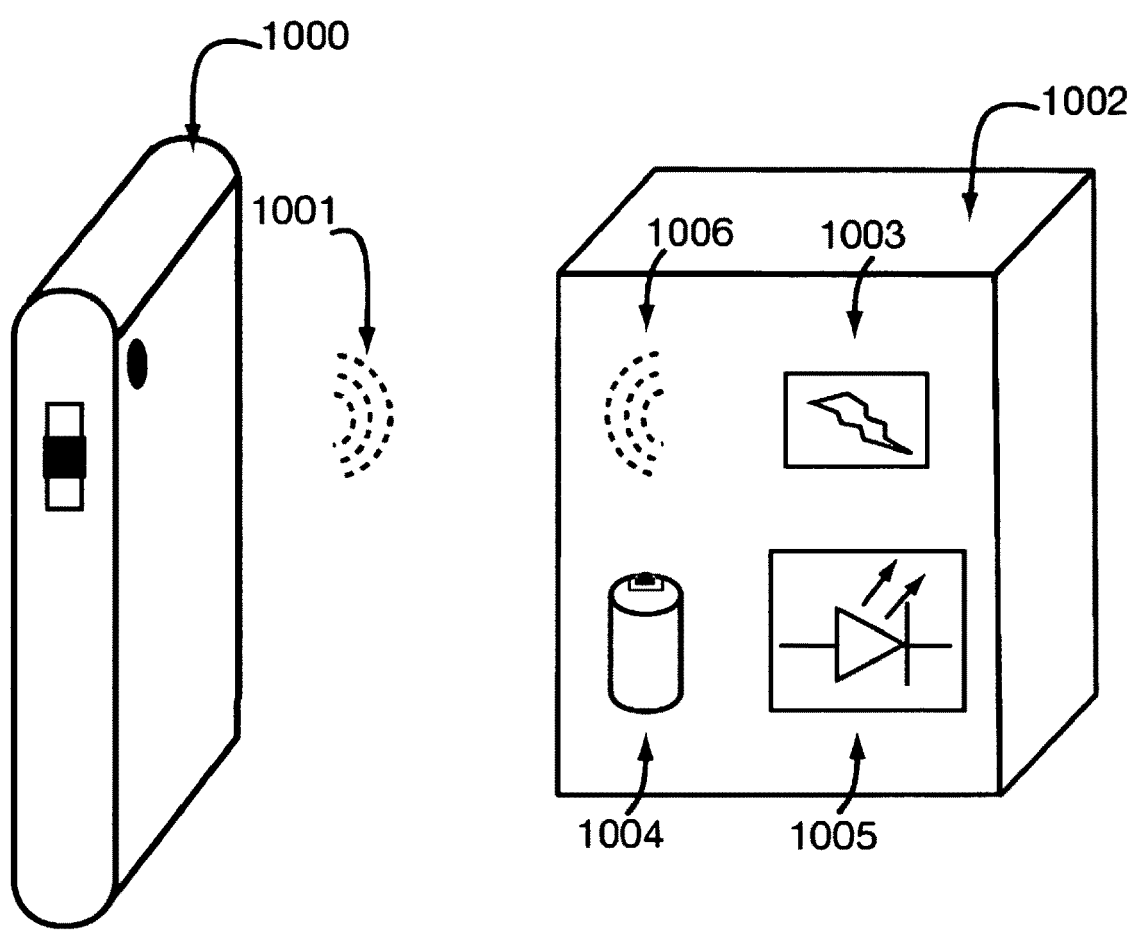
FIG. 10 illustrates an alternative wireless embodiment of the ELA.

FIG. 10 shows another embodiment of ELA. As suggested by FIG. 7, ELA communication can be wireless as well.

In this alternative ELA embodiment, the CEPMD (1000) communicates wirelessly (1001) with the ELA (1002) through its built-in wireless capabilities. Examples of such built-in capabilities that commonly exist in portable media devices are WI-FI, Bluetooth, IR, and sounds input/output.

The only critical difference between the wireless embodiment and the wired embodiment of the ELA is the requirement of built-in wireless connectivity (1006). Such design may also require ELA to have its own power storage unit (1004), unless ELA has a steady source of power. Similar to a wired embodiment ELA, a basic wireless ELA embodiment would also contain photoflash lights (1003) and other deliveries such as LED preview lights (1005).

Software synchronization techniques detailed in FIG. 2-4 apply to wireless embodiment of the ELA as well. The only minor exception requires the software to take into consideration the wireless communication delay between the two devices. This delay could vary based on distance and other environmental factors. Hence, the communication delay information needs to be updated periodically to ensure the synchronization software has the most up-to-date delay information for its calculations.

While various embodiment of the present invention have been shown and described, it should be understood that other modifications, substitutions and alternatives can be made without departing from the spirit and scope of the invention, which should be determined from the appended claims.

We claim:

1. A method of synchronizing a camera equipped portable media device (CEPMD) having a camera shutter trigger, and an external lighting apparatus (ELA), the method comprising the steps of:
   1) providing hardware and software comprising;
      a. the CEPMD having the camera shutter trigger;
      b. the ELA having one or more trigger signals for triggering a photoflash;
      c. a means for connecting the CEPMD and the ELA;
      d. a communication protocol between the CEPMD and the ELA; and
      e. a synchronization software for controlling the camera shutter trigger and the one or more trigger signals; and
   2) calculating simultaneously by use of the synchronization software:
      i. a first time delay from sending a trigger signal of the one or more trigger signals to producing the photoflash on the ELA; and
      ii. a second time delay to setup the CEPMD for a photo capture;
   3) calculating max errors to verify that the photoflash occurs within a duration between a PFlash_start_earliest time and a PFlash_start_latest time;
   4) triggering at a pre-determined time the ELA and the synchronization software during the a T-exposure time to create the photoflash between the PFlash_start_earliest and the PFlash_start_latest time; and
   5) capturing the photoflash having a duration of a PFlash_start to a PFlash_end time by enlarging the T-exposure time to a point that the max errors is not greater than the T-exposure time.

2. The method as defined in claim 1, wherein the step of calculating the max errors, resulting from physical uncertainties, manufacturing uncertainties, and a lack of software control, further comprises:
   i. calculating a first max error by taking a difference in time between the PFlash_start and the PFlash_start earliest; and
   ii. calculating a second max error by taking a difference in time between the PFlash_start_latest and a sum of the PFlash_start and the PFlash_duration.

3. The method as defined in claim 1, wherein the T-exposure time is defined as a time where a plurality of CEPMD image sensors are exposed to a desired captured object.

4. A method of synchronizing a camera-equipped portable media device (CEPMD) having a camera shutter and an external lighting apparatus (ELA) the method comprising the steps of:
   1) providing hardware and software comprising;
      a. the CEPMD having the camera shutter trigger;
      b. the ELA having one or more trigger signals for triggering a photoflash;
      c. a means for connecting the CEPMD and the ELA;
      d. a communication protocol between the CEPMD and ELA; and
      e. a synchronization software for controlling the camera shutter trigger and the one or more trigger signals;
   2) controlling via the synchronization software a timing of the camera shutter trigger and the one or more trigger signals to optimally illuminate a subject when a picture is taken to capture an image; and
   3) recording via the synchronization software a plurality of captured images in consecutive sessions and processing the plurality of captured images to regenerate a composite image, when exposure or timing control of the CEPMD is not available.

5. The method as defined in claim 4, wherein a first image is captured without the photoflash, and is used as a baseline captured image for later comparisons.

6. The method as defined in claim 5, wherein the synchronization software compares the first baseline captured image to subsequent images.

7. The method as defined in claim 4, wherein the synchronization software minimizes an amount of duration the CEPMD is in a processing mode and maximizes an amount of duration the CEPMD is in an exposure mode.

8. The method as defined in claim 7, wherein the processing mode duration is a sum of 1) a time it takes for the CEPMD to stop exposure and record the image and 2) a time it takes to prepare the CEPMD to capture another image.

9. The method as defined in claim 4, further comprising the steps of splitting the image between multiple captured images, and post processing partially lit captured images to produce the composite image.

10. The method as defined in claim 4, further comprising a step of creating a capture window defined by a duration between PFlash_start_earliest and PFlash_start_latest.

11. The method as defined in claim 10, further comprising a step of recording the plurality of captured images, wherein each image of the plurality of captured images includes a pixel luminosity value.

12. The method as defined in claim 11, further comprising a step of selecting the captured image with a highest pixel luminosity value for a successful synchronized image.

13. The method as defined in claim 12, further comprising a step of reconstructing the composite image through use of the synchronization software using data of a time of the photoflash and a pixel luminosity values.

14. The method as defined in claim 4, further comprising a step of initiating a series of captured frame images, wherein each captured frame image is made up of a plurality of partial frames each having a luminosity value, including
   i. a baseline captured frame image created without the photoflash; and
   ii. a plurality of subsequent captured frame images, created by partially exposing the plurality of subsequent captured frame images to the photoflash.

15. The method as defined in claim 14, wherein the photoflash has a duration defined between a PFlash_start and a PFlash_end.

16. The method as defined in claim 15, further comprising a step of recording and storing the baseline captured image and the plurality of subsequent captured frames.

17. The method as defined in claim 16, further comprising a step of comparing, using the pixel luminosity values, the baseline captured image to the plurality of partial frames.

18. The method as defined in claim 7, further comprising a step of selecting a partial frames of the plurality of partial frames with a highest pixel luminosity.

19. The method as defined in claim 18, further comprising a step of reconstructing, via the synchronization software, the selected partial frames of the plurality of partial frames into the composite image by determining a time of the photoflash.

20. A method of creating an image using synchronization software, a camera equipped portable media device (CEPMD) camera shutter trigger, and an external lighting apparatus (ELA) having a photoflash, the method comprising the steps of:
  initiating a baseline image capture prior to using the photoflash;
  recording the baseline image having a pixel luminosity value;
  storing the baseline image as data 0;
  creating a capture window defined by a duration between a PFlash_start_earliest and a PFlash_start_latest;
  recording a plurality of captured images, wherein each image of the plurality of captured images includes the pixel luminosity value;
  starting the photoflash when one image of the plurality of captured images is being captured, wherein a duration of the photoflash is defined between a PFlash_start and a PFlash_end;
  storing, the plurality of captured images;
  labeling the plurality of captured images sequentially as data 1 to data N;
  comparing the baseline captured image pixel luminosity value to each pixel luminosity value of the plurality of captured images and;
  selecting the captured image with a highest pixel luminosity value for a successful synchronized image.

21. The method as defined in claim 20, wherein the step of starting the photoflash is random.

22. The method as defined in claim 20, wherein the step of starting the photoflash is random having a success capture rate is measured by (T_exposure)/(T_exposure+T_setup+T_record)[over a period of N−1]*(T_exposure+T_setup+T_record).

23. A method of synchronizing, using synchronization software, a camera equipped portable media device (CEPMD) having a CMOS rolling camera shutter trigger and an external lighting apparatus (ELA) where a photoflash is spread between a plurality of captured frame images, and wherein each captured frame image is made up of a plurality of partial frames each having a pixel luminosity value, the method comprising the steps of:
  initiating a series of captured frames, including
    i. a baseline captured frame image created without the photoflash, and
    ii. a plurality of subsequent captured frame images created by partially exposing the plurality of subsequent captured frame images to the photoflash;
  recording and storing the baseline captured frame image and the plurality of subsequent captured frame images;
  labeling the baseline captured frame image as 0, the plurality of subsequent captured frame images sequentially as a frame N to a frame N+m, and the plurality of partial frames as 1 through m;
  detecting the plurality of partial frames exposed to the photoflash using the pixel luminosity value for each of the partial frames;
  comparing the pixel luminosity value of the baseline captured frame image to the pixel luminosity values of the plurality of partial frames exposed to the photoflash;
  selecting partial frames of the plurality of partial frames with a highest pixel luminosity; and
  reconstructing, via the synchronization software, the selected partial frames of the plurality of partial frames into a composite image.

24. The method as defined in claim 23, wherein the photoflash has a duration defined between a PFlash_start and a PFlash_end, and wherein the PFlash_start occurs about halfway into a duration of a rolling shutter frame_n, and the PFlash_end extends into a subsequent rolling shutter frame_N+1.

25. The method as defined in claim 23, further comprising the steps of:
  i. partially exposing a captured frame image N to the photoflash, wherein only partial frames of the plurality of partial frames occurring during a first half duration of the duration are exposed to the photoflash; and
  ii. partially exposing a captured frame image N+1 to the photoflash, wherein only partial frames of the plurality of partial frames occurring during a first half duration of the duration are exposed to the photoflash.

* * * * *